United States Patent [19]
Furukawa et al.

[11] Patent Number: 6,078,556
[45] Date of Patent: Jun. 20, 2000

[54] SYSTEM FOR PRODUCING A LIQUID CRYSTAL DRIVING SIGNAL

[75] Inventors: Junichi Furukawa; Kiyoshi Tateishi; Noriaki Murao, all of Saitama-ken, Japan

[73] Assignee: Pioneer Electronic Corporation, Tokyo, Japan

[21] Appl. No.: 09/084,354

[22] Filed: May 27, 1998

[30] Foreign Application Priority Data

May 27, 1997 [JP] Japan ................................. 9-153034

[51] Int. Cl.[7] ........................................................ G11B 7/00
[52] U.S. Cl. ........................... 369/112; 369/54; 369/44.32
[58] Field of Search ................................. 369/112, 44.32, 369/58, 124, 54, 53

[56] References Cited

U.S. PATENT DOCUMENTS 5,859,818  1/1999  Tateishi et al. ........................ 369/112

Primary Examiner—Nabil Hindi
Attorney, Agent, or Firm—Arent Fox Kintner Plotkin & Kahn, PLLC

[57] ABSTRACT

A CPU is provided for producing a control signal. In accordance with the control signal, a modulated signal modulated in pulse width by the control signal is produced. The modulated signal has a predetermined duty ratio based on the control signal. A liquid crystal driving signal having the duty ratio based on the modulated signal is produced. The CPU is for producing the control signal for setting the duty ratio in accordance with a refractive index at each of the unit electrode of the liquid crystal panel.

2 Claims, 8 Drawing Sheets

FIG.3
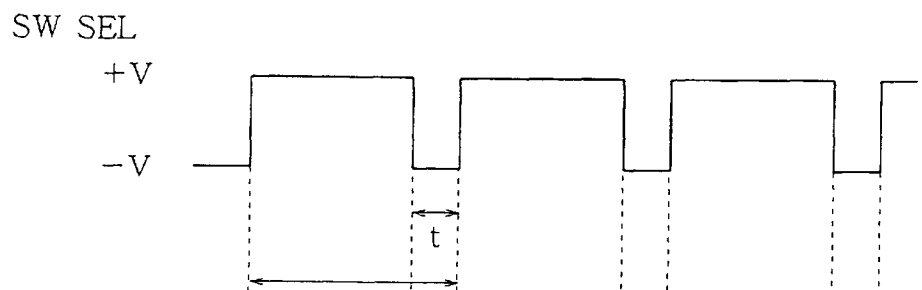
(a) SW SEL
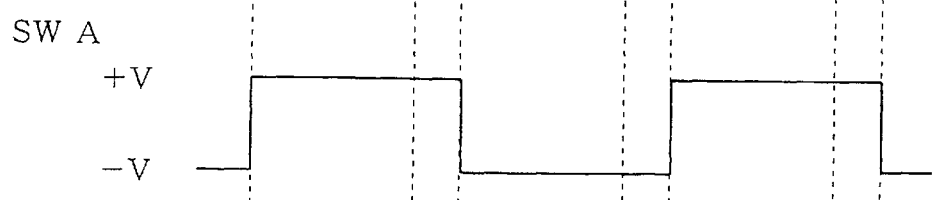
(b) SW A
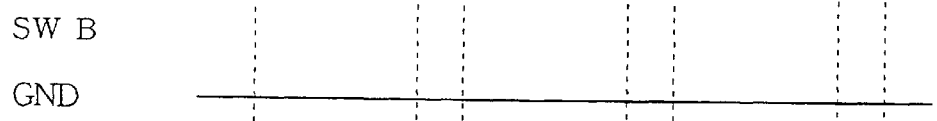
(c) SW B
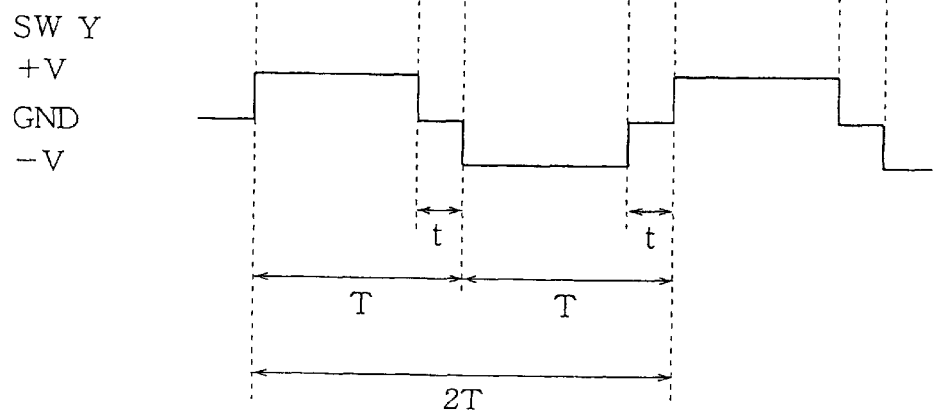
(d) SW Y

FIG.5
(a)
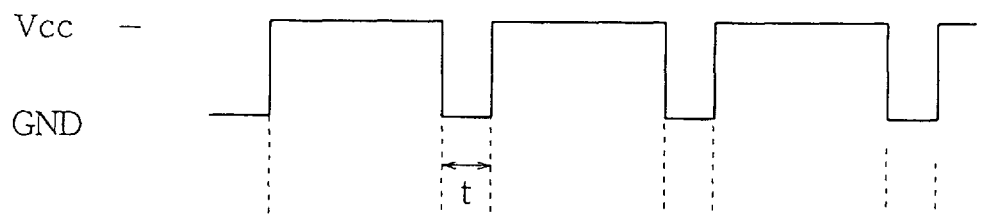
(b)
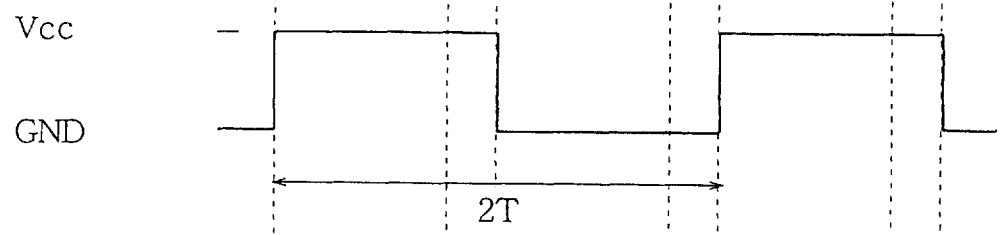
(c)
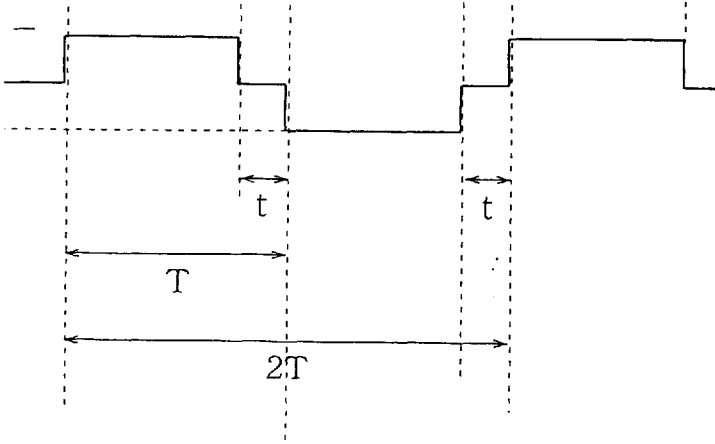

SYSTEM FOR PRODUCING A LIQUID CRYSTAL DRIVING SIGNAL

BACKGROUND OF THE INVENTION

The present invention relates to a system for producing a liquid crystal driving signal and an optical disc reproducing system provided with the system for producing a liquid crystal driving signal.

Recently, the DVD (Digital Versatile Disc) having a large capacity larger than that of the compact disc has been proposed. Since the DVD has a high density, the tilt angle margin of the disc at the reproducing thereof is small. Therefor, it is desirable to provided a control means for adjusting the tilt angle in the reproducing system.

The assignee of the present invention proposed a system for correcting the wavefront aberration by using a liquid crystal panel, the aberration is caused by the inclination of the thickness of the disc, in the Japanese Patent Application Laid Open Publication 9-128785.

FIG. 6 shows an optical disc reproducing system using the principle disclosed in the publication. A laser beam emitted from a laser 1 is reflected from a half mirror 2, passes through a liquid crystal panel 3 and applied to an optical disc 5 by an objective 4 to form a spot on the disc.

A laser beam reflected from the optical disc 5 passes through the objective 4, liquid crystal panel 3, and half mirror 2, and condensed on a photo-detector 7 by a condenser lens 6. Thus, a pickup is composed.

A tilt sensor 8 is provided adjacent the pickup for detecting the tilt angle of the disc 5. The tilt sensor 8 has one light emitter and two photo-detectors which receive light reflected from the disc 5. Outputs of the two photo-detectors are applied to an adder 10 which produces a difference of the outputs as a tilt error signal. The error signal is fed to an A/D converter 11.

A CPU 17 applies a control signal based on the error signal to a gain adjuster 13. The gain adjuster 13 adjusts the amplitude (gain) of a standard signal fed from an oscillator 12 in accordance with the control signal. The standard signal has, for example, a duty ratio of 50%. The adjusted standard signal is applied to the liquid crystal panel 3 as a driving signal. The gain adjuster 13 comprises a plurality of adjusting devices, each of which is connected to each unit electrode of the liquid crystal panel so as to adjust the tilt angle of the disc 5 as described hereinafter.

FIG. 7a is a sectional view of the liquid crystal panel 3, and FIG. 7b is a plan view of the panel. The liquid crystal panel 3 comprises opposite transparent glass substrates 301a and 301b, transparent electrodes 302a and 302b evaporated on the substrates 301a, 301b, orientation films 303a and 303b, and liquid crystal 303 sealed between the orientation films.

At least one of the electrodes 302a and 302b comprises a plurality of unit electrode 302c arranged in matrix as shown in FIG. 7b. Each of the unit electrode 302c is connected to a corresponding gain adjuster 13.

FIG. 8 shows a molecule M of the liquid crystal 304. The molecule M has a refractive index of n1 in the optical axis and a refractive index of n2 in the direction perpendicular to the optical axis. Namely, the liquid crystal is a double refraction crystal having different refractive indexes in direction. For example, the liquid crystal is nematic liquid crystal.

FIGS. 9a to 9c show various directions of molecules M when applied voltage is changed.

FIG. 9a shows the direction when no voltage is applied. FIGS. 9b and 9c shows directions when alternating voltages e1 and e2 are applied (e1<e2).

As shown in figures, the direction of the molecule changes from the horizontal direction to the vertical direction.

Each of FIGS. 9a to 9c shows the state when equal voltages are applied to all unit electrodes of the liquid crystal 3 so that the directions of the molecules in each figure is the same. However, if the voltage applied to each unit electrode is different from that of other pieces, the direction necessarily changes. Thus, the refractive index of each molecule can be changed between n1 and n2.

When the refractive index of the liquid crystal is changed, the light beam passing through the liquid crystal changes in the optical path of the difference given by the following formula.

Optical path difference: $\Delta n \cdot d$ where $\Delta n$ is the change quantity of the refractive index and d is the thickness of the liquid crystal.

This means that a phase difference obtained by the following formula is given to the light beam passing through the liquid crystal.

Phase difference: $\Delta n \cdot d (2\pi/\lambda)$ where $\lambda$ is the wavelength of the light beam.

Therefore, it is possible to correct the wavefront aberration caused by the inclination of the disc by controlling the refractive index n of each part of the liquid crystal so as to cancel the aberration generating in the objective 4.

However, in the liquid crystal driving signal producing system, it is a problem to realize the controlling of the amplitude of the liquid crystal driving signal.

SUMMARY OF THE INVENTION

An object of the present invention is to provide a novel system for producing a liquid crystal driving signal.

According to the present invention, there is provided a system for producing a driving signal for a liquid crystal panel, for correcting a wavefront aberration in an optical system for an optical disc, the liquid crystal panel having a plurality of unit electrodes, the system comprising, control means for producing a control signal, a modulated signal generator for producing a modulated signal modulated in pulse width by the control signal from the control means, the modulated signal having a predetermined duty ratio based on the control signal, producing means for producing a liquid crystal driving signal having the duty ratio based on the modulated signal, the control means being provided for producing the control signal for setting the duty ratio in accordance with a refractive index at each of the unit electrode of the liquid crystal panel.

The system further comprises a tilt sensor for detecting a tilt of the optical disc and for producing a tilt signal, the control means being provided for producing the control signal dependent on the tilt signal so as to correct the wavefront aberration.

These and other objects and features of the present invention will become more apparent from the following detailed description with reference to the accompanying drawings.

BRIEF DESCRIPTION OF DRAWINGS

FIG. 3 shows waveforms at various points of FIG. 2;

FIG. 5 showing waveforms at three points A, B and C in the system of FIG. 4;

FIG. 7b is a plan view of the panel of FIG. 7a;

DETAILED DESCRIPTION OF THE PREFERRED EMBODIMENT

Figure 1:
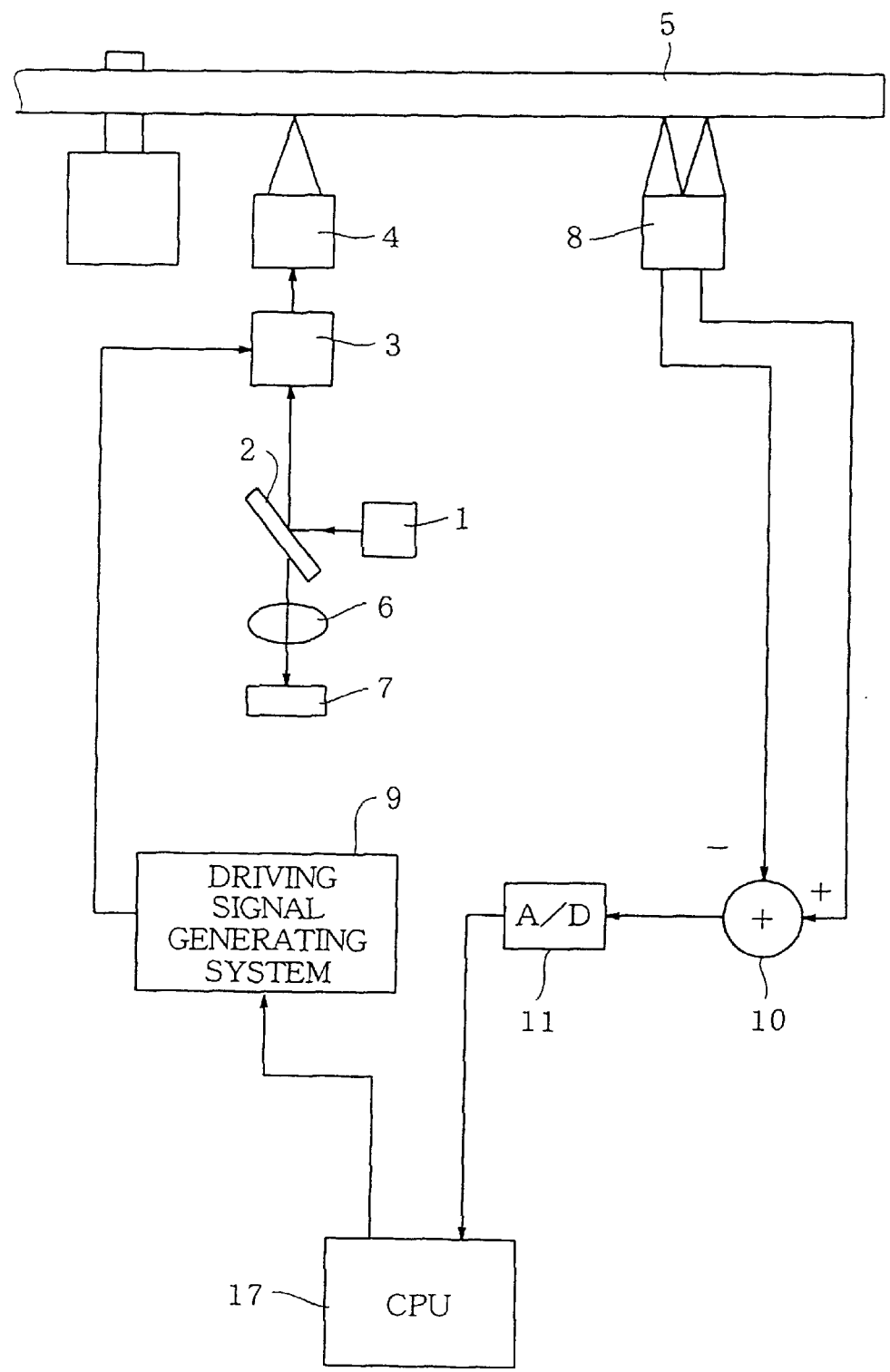
FIG. 1 is a block diagram of an optical disc reproducing system provided with a liquid crystal driving signal producing system of a first embodiment of present invention.
Figure 6:
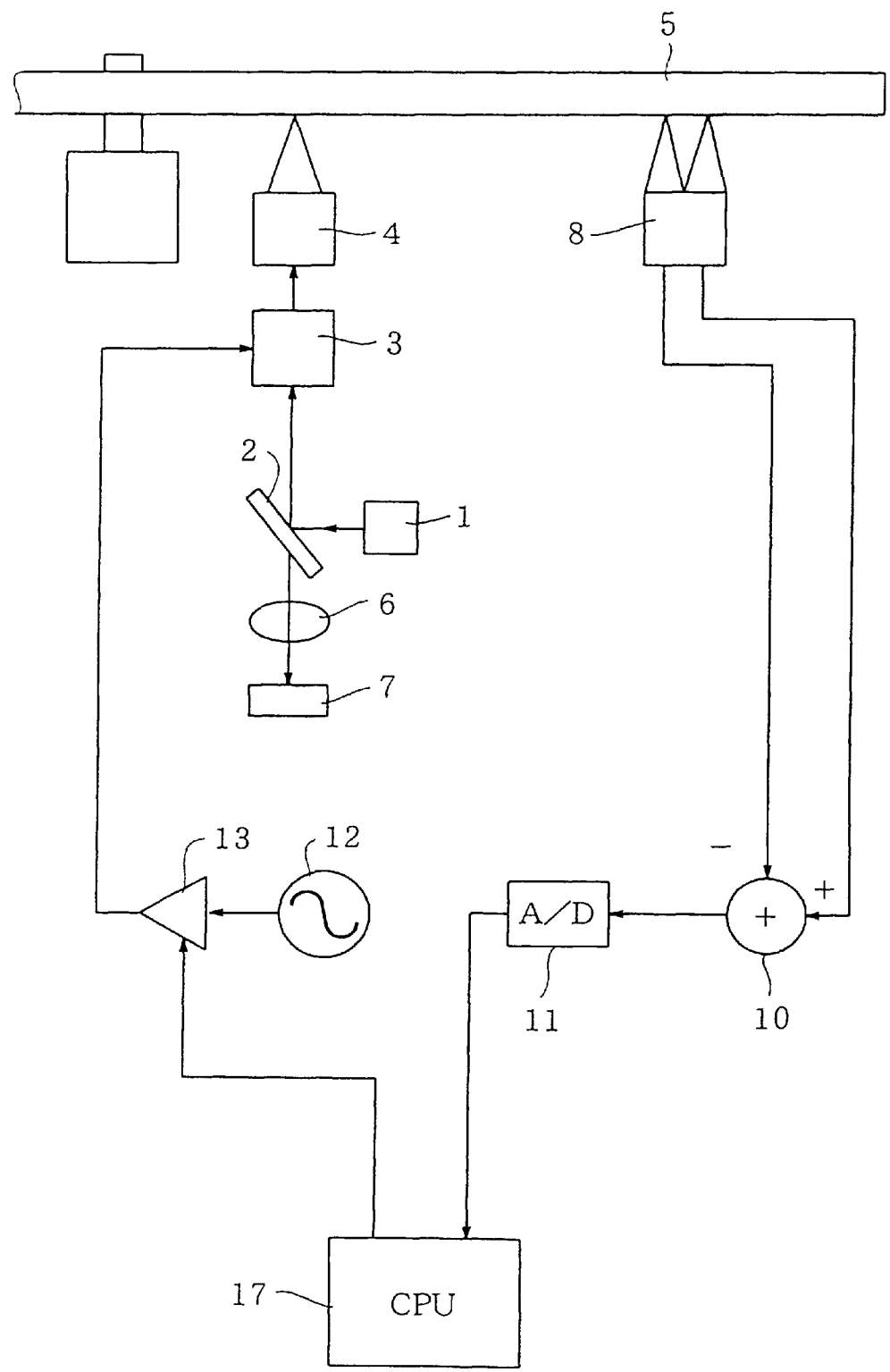
FIG. 6 shows a conventional optical disc reproducing system.
Figure 7A:
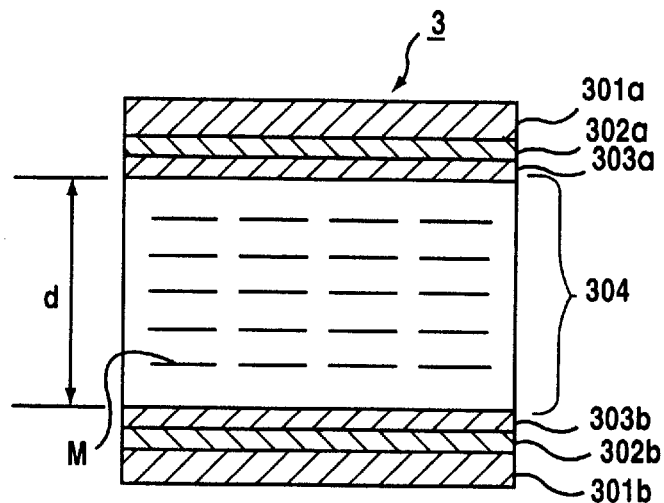
FIG. 7a is a sectional view of a conventional liquid crystal panel.
Figure 7B:
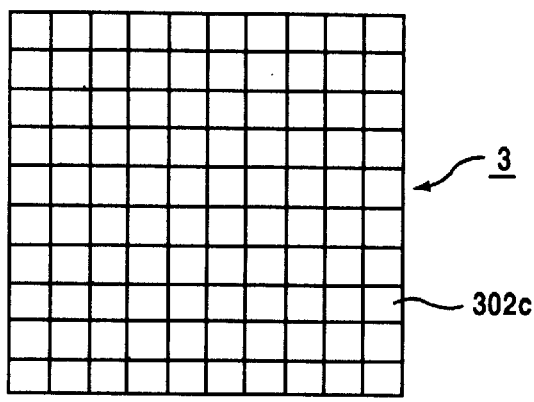
Figure 8:
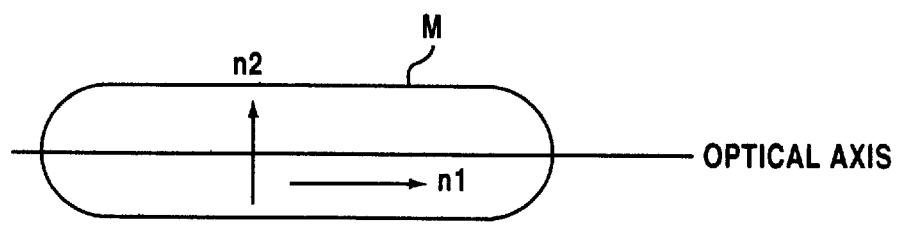
FIG. 8 shows a molecule of the liquid crystal.
Figure 9A:
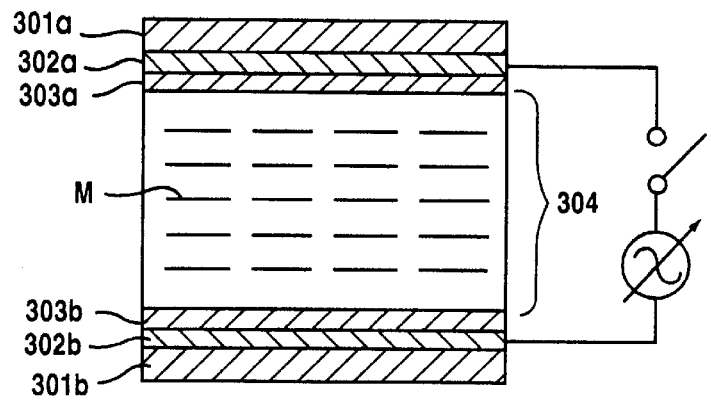
FIG. 9a shows the direction of the molecule when no voltage is applied.
Figure 9B:
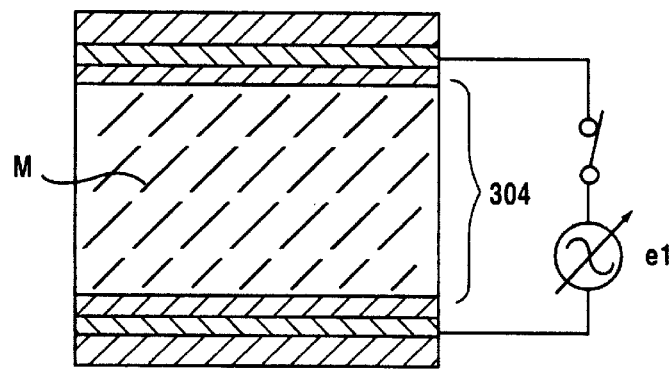
FIGS. 9b and 9c shows directions of the molecule when alternating voltages are applied.
Figure 9C:
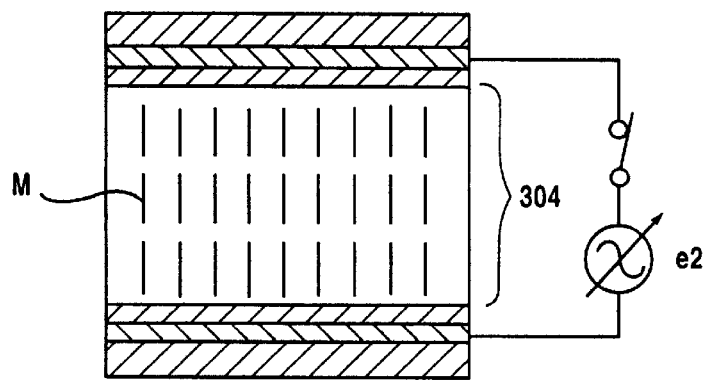

FIG. 1 shows a block diagram of an optical disc reproducing system provided with a liquid crystal driving signal producing system of a first embodiment of the present invention. The same parts as the system of FIG. 6 are identified with the same reference numbers as FIG. 6, thereby omitting detailed description thereof. The system has a liquid crystal driving signal producing system 9.

Figure 2:
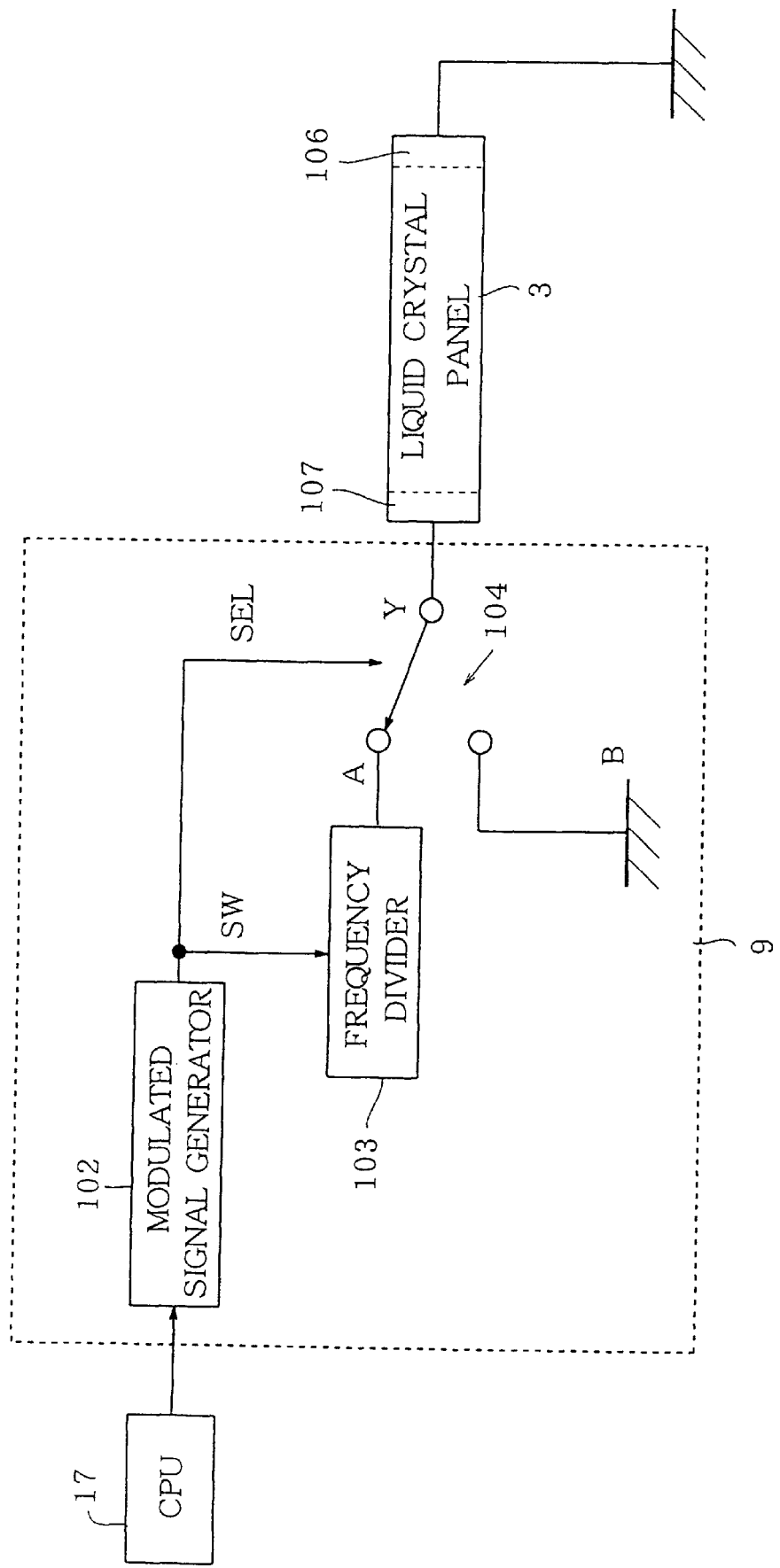
FIG. 2 is a block diagram of the liquid crystal driving signal producing system of FIG. 1.

FIG. 2 is a block diagram of the liquid crystal driving signal producing system 9 of FIG. 1.

In FIG. 2, the CPU 17 is connected to a modulated signal generator 102 of the system 9. The modulated signal is modulated in pulse width by a control signal of the CPU 17. The modulated signal generator 102 produces pulses having a duty ratio dependent on the control of the CPU.

The middle potential between the high level and the low level of the modulated signal coincides with the middle potential (hereinafter called standard potential) of the alternating current applied to a unit electrode 106 opposite to a unit electrode 107 of the liquid crystal panel 3 for driving thereof. The standard potential for driving the liquid crystal panel 3 is the ground potential of FIG. 2.

The output pulses of the modulated signal generator 102 are applied to a frequency divider 103 for dividing the input frequency to the frequency of ½ and to a switch 104 as a select control signal SEL. The switch 104 comprises a point A connected to an output of the frequency divider 103, a point B at the standard potential, and an output terminal Y of the switch 104 connected to the liquid crystal panel.

FIG. 3 shows waveforms at various points of FIG. 2. The abscissa of FIG. 3 represents time and the ordinate represents the level of the liquid crystal driving signal.

FIG. 3(a) shows the waveform of the modulated signal generator 102, namely the select control signal SEL. The duty ratio thereof is 100×(1−t/T)%.

FIG. 3(b) shows the waveform at the point A. The frequency of waveform is divided into ½ of the frequency of the output of the modulated signal generator 102. The duty ratio of the signal at the point A is 50% and has a repetition rate of 2T.

FIG. 3(c) is the waveform at the point B, that is the ground potential GND.

FIG. 3(d) is the waveform of the liquid crystal driving current at the point Y. When the level of select control signal SEL is at +V, the signal at the point A is selected. When the level of the signal SEL is at −V, the signal at the point B is selected.

Therefore, the signal at the point Y has the waveform of FIG. 3(d). Namely, the waveform has a period t of an intermediate level at the ground potential and periods of T−t at +V and at −V.

The integration value of the positive potential of the waveform is equal to the integration value of the negative potential. This means that the waveform does not include a direct current component.

The liquid crystal has a characteristic that the liquid crystal is broken when an alternating current including a direct current component is applied thereto. However, the driving signal of the present invention does not include a direct current component as described above.

In order to set a refractive index of each part of the liquid crystal panel, the CPU obtains a duty ratio necessary for producing a liquid crystal driving quantity corresponding to the refractive index to be set. Thereafter, the CPU causes the modulated signal generator 102 to produce a modulated signal having the obtained duty ratio. The modulated signal is applied to the frequency divider 103 and to the switch 104 as a select control signal SEL. Thus, a liquid crystal driving alternating current having the desired duty ratio is applied to each of the unit electrodes of the liquid crystal panel.

Figure 4:
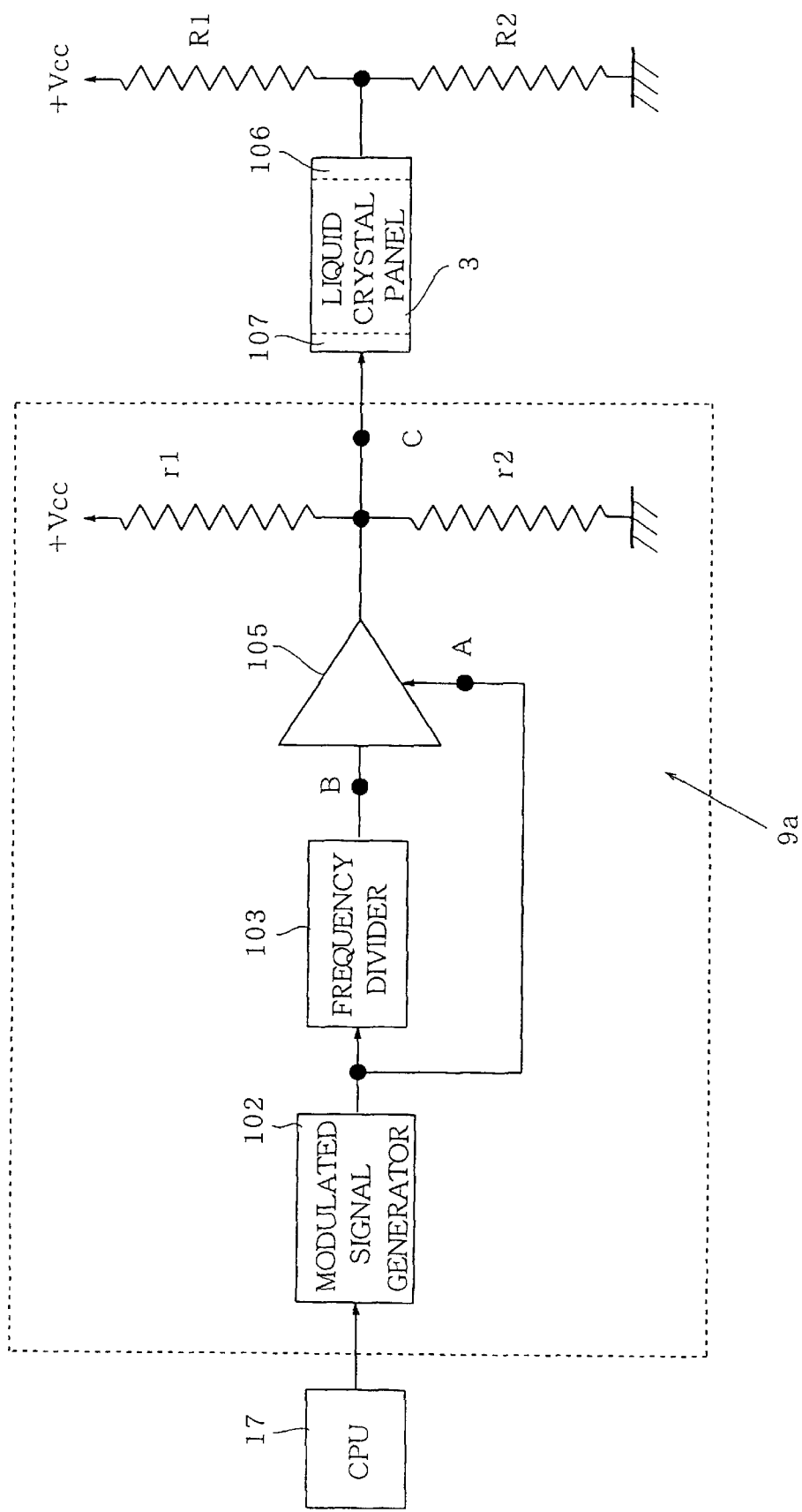
FIG. 4 is a block diagram of a system according to a second embodiment of the present invention.

FIG. 4 shows a block diagram of a system according to the second embodiment of the present invention. In the system, a liquid crystal driving signal producing system 9a is provided. The system 9a is provided with a three-state buffer 105 in place of the switch 104 of FIG. 2. In FIG. 4, r2=r2 and R1=R2.

Referring to FIG. 5 showing waveforms at three points A, B and C in the system of FIG. 4, FIG. 5(a) shows the waveform of the modulated signal generator 102, namely a control signal for the three-state buffer 105. The duty ratio thereof is 100×(1−t/T)%.

FIG. 5(b) shows the waveform at the point B. The frequency of waveform is divided into ½ of the frequency of the output of the modulated signal generator 102. The duty ratio of the signal at the point B is 50% and has a repetition rate of 2T.

FIG. 5(c) is the waveform at the point C, that is the waveform of the liquid crystal driving current. When the level of control signal for the three-state buffer 105 is at Vcc (high level), the three-state buffer 105 becomes an active state. As a result, the level at the point C becomes Vcc or ground level in dependency on the output (point B) of the frequency divider 103. On the other hand, when the control signal for the three-state buffer 105 is at the ground level (low level), the three-state buffer 105 becomes a non-activated state, so that the level at the point C becomes Vcc/2.

Although in the above described system, the output signal of the switch 104 is directly applied to the liquid crystal, a suitable amplifier may be disposed before or after the signal generator 102. Furthermore, the system can be applied to an optical disc recording system.

In accordance with the present invention, by setting the duty ratio of the liquid crystal driving signal to a proper value, the refractive index of the liquid crystal is set so as to ensure the correction of the wavefront aberration.

While the invention has been described in conjunction with preferred specific embodiment thereof, it will be understood that this description is intended to illustrate and not limit the scope of the invention, which is defined by the following claims.

What is claimed is:

1. A system for producing a driving signal for a liquid crystal panel, for correcting a wavefront aberration in an optical system for an optical disc, the liquid crystal panel having a plurality of unit electrodes, the system comprising:

control means for producing a control signal;

a modulated signal generator for producing a modulated signal modulated in pulse width by the control signal from the control means;

the modulated signal having a predetermined duty ratio based on the control signal;

a frequency divider for dividing the modulated signal;

selector means responsive to the modulated signal for selecting an output signal of the frequency divider and an intermediate level between a higher potential and a lower potential thereby producing a liquid crystal driving signal having the duty ratio based on the modulated signal;

the control means being provided for producing the control signal for setting the duty ratio in accordance with a refractive index at each of the unit electrode of the liquid crystal panel.

2. The system according to claim 1 further comprising a tilt sensor for detecting a tilt of the optical disc and for producing a tilt signal, the control means being provided for producing the control signal dependent on the tilt signal so as to correct the wavefront aberration.

* * * * *